Jan. 21, 1958     R. S. GROCHMAL     2,820,666
EXPANDABLE TRAILERS

Filed Aug. 5, 1955     2 Sheets—Sheet 1

INVENTOR.
RICHARD S. GROCHMAL
BY

Jan. 21, 1958  R. S. GROCHMAL  2,820,666
EXPANDABLE TRAILERS
Filed Aug. 5, 1955  2 Sheets-Sheet 2
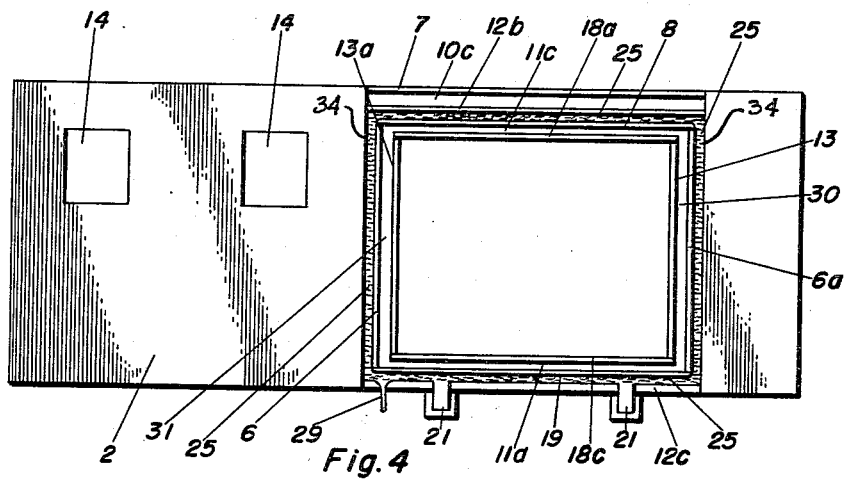
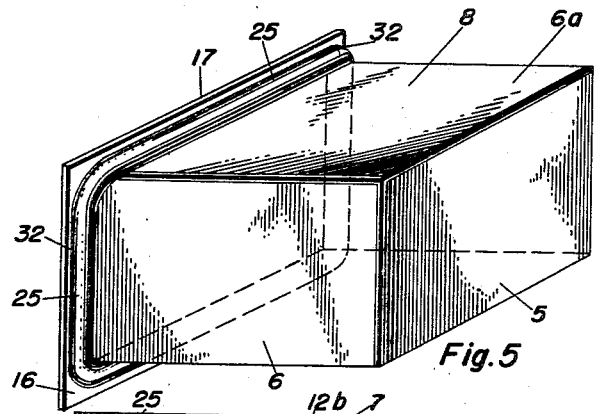
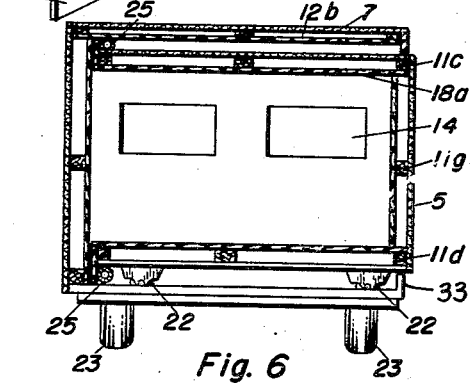
INVENTOR.
RICHARD S. GROCHMAL United States Patent Office 2,820,666
Patented Jan. 21, 1958

2,820,666

EXPANDABLE TRAILERS

Richard S. Grochmal, Indian Orchard, Springfield, Mass.

Application August 5, 1955, Serial No. 526,715

1 Claim. (Cl. 296—23)

This invention is concerned with improvements in expendable trailers and the like. Heretofore many trailers have been manufactured and marketed which have facilities for expanding into larger units and yet which contract when being pulled along the road. These trailers have serious engineering problems with respect to keeping out the elements and weather from those portions of the trailer which are expanded. Further, tolerances in manufacturing such types of trailers are quite critical. There is the further problem of once the trailer has been expanded and placed upon a lot the expanded portion may settle lower or the main portion may settle lower, causing a break in the seal and allowing the elements to gain admittance.

These types of trailers have employed seals which keep out the elements which are inadequate, clumsy, and not adaptable to solving the aforementioned problems.

It is an object to provide a trailer seal arrangement wherein the expandable trailer may be manufactured with greater tolerance than heretofore.

It is still another object to provide a seal that will be sufficiently resilient and expandable to maintain any openings closed despite the fact either the main part or the expandable part of the trailer will settle down.

It is still another object to provide a large living room section of a mobile type home.

It is yet a further object to provide a seal that may be easily inflated.

It is yet an additional object to provide a seal that may be light of weight, easily handled, and packed and designed particularly for portability.

It is yet a further object to provide a seal which has excellent insulation characteristics for preventing cold and heat from obtaining admittance into the livable portion of the trailer.

It is yet another object of this invention to provide a trailer which is compactable so as to conform to highway regulations and yet which is so designed as to provide larger living quarters when it is parked.

These and further objects are attained by the use of a drawer type unit that expands from a main body portion and particularly by the use of an inflatable seal that is mounted on the four sides of the expanded drawer type unit flush with the surfaces of the main body portion.

For a better understanding of the invention, reference is made to the following detailed description in which:

Figure 4 is a side elevational view of the trailer with the front surface of the expanded portion removed.

Figure 5 is a perspective view of the expanded portion of the trailer with emphasis upon the inflatable seal.

Figure 6 is a view of Figure 3 in which the expanded portion is almost completely in its closed position.

Figure 1:
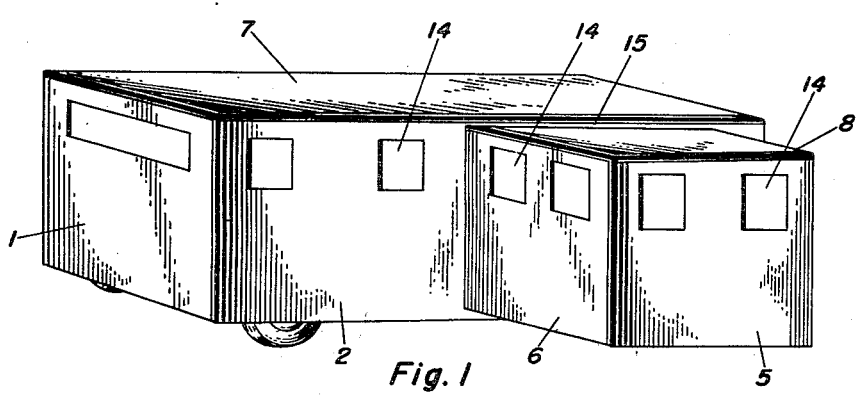
Figure 1 is a perspective view of the trailer expanded.
Figure 2:
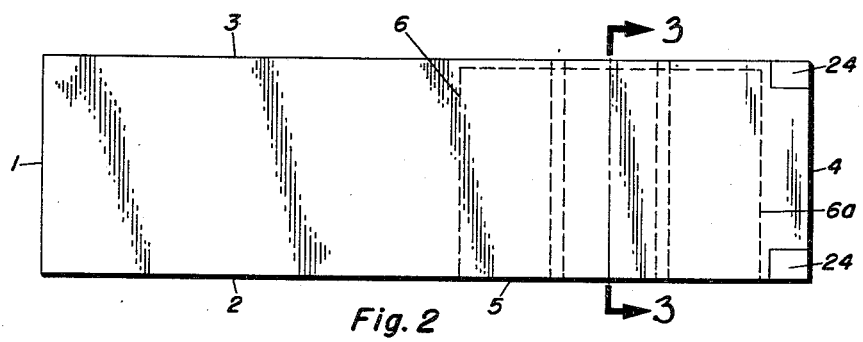
Figure 2 is a top plan view of the trailer with the expanded portion closed and with the various portions shown in dotted lines.

Reference is made to Figure 1 which discloses a perspective view of the expandable trailer. The rear 1 of the trailer is above the wheels 23. The top of the trailer is shown by numeral 7. There are windows 14 throughout the trailer. The sides of the trailer are designated as 2 (see Figure 1) and as 3 (see Figure 2). A drawer-like section fits within the forward portion of the trailer as can be seen by the dotted lines in Figure 2. This expandable portion has a rear side 6, a front side 6a, and a side portion 5 which are connected to make an enclosure.

Figure 3:
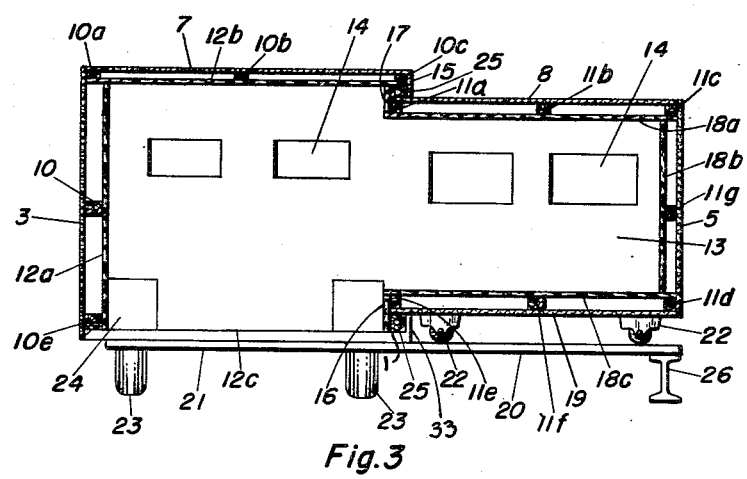
Figure 3 is a cross section view taken along line 3—3 of Figure 2 but with the trailer expanded.

Reference is made to Figure 3 which shows a more detailed construction of the framework of the trailer. Starting on the left side of Figure 3 the side panel 3 is shown. Beneath the side panel are three braces designated as 10a in the upper portion, 10 in the middle, and 10e at the bottom. Connected on the other side of these braces is an inside panel 12a. At the top of the trailer is a roof 7 that has beneath it in the left corner the brace 10a, a brace 10b in the middle, and a third brace in the right hand corner 10c. Affixed to the opposite side of these braces is a ceiling panel 12b. In front of the right end of room 7, brace 10c and panel 12b is a weather board 15. At the bottom of the trailer is a floor 12c. Beneath the floor 12c is a track 21 (see Figure 4). This is the structure of the fixed trailer portion in which the movable portion of the trailer may be stored.

The movable portion of the trailer comprises at the top an inside horizontal weather board 17. Affixed to this weather board is a brace 11a and the roof 8 of the expandable portion. Beneath roof 8 is, of course, brace 11a and at the middle portion of roof 8 is brace 11b and at the other end portion is brace 11c. Beneath braces 11a, 11b and 11c is the ceiling 18a of the expandable portion. The inside wall of the far side 6a is designated as 13 and the inside wall of the rear side 6 is designated 13a (see Figure 4). The bottom of the expandable portion is designated as the lower bottom 19. Above bottom 19 are the braces 11e, 11d and 11f. On top of brace 11f is the inside flooring 18c. Adjoining brace 11e is an inside horizontal weather board 16. The side portion 5 of the trailer has beneath it in the middle a brace 11g. Affixed to brace 11g on the inside is inside wall panel 18b.

Beneath the bottom 19 are mounted a pair of rollers at each end of the expandable portion. These rollers are indicated by the numerals 22. They fit down into the track 21 which is in two sections. The section which is removable is indicated as 20 and is mounted on a portable support 26. Mechanically the dimensions of section 20 are slightly narrower than the dimensions of track 21 so that track 20 may fit down inside of track 21 to make it a continuous track on which the rollers may travel. Mounted around the outside of the movable portion is an inflatable seal 25. This can be seen located behind horizontal weather board 15 and lower horizontal weather board 33 and beneath brace 10c in Figure 3 and can be further understood by reference to Figure 5 which shows the inflatable seal 25 in a perspective view. Inside the trailer are protrusions above the wheels 23 which are designated by the numeral 24. If a different wheel arrangement is employed, it is not necessary to have the protrusions 24, obviously. In the instant embodiment, however, the wheels are above the bottom of the floor since the body of the trailer is built low to the ground. It is also to be noted that there is a valve means indicated as 29 connected to the inflatable seal 25 which may be employed to blow the seal up or to deflate it.

Reference is made to the view of Figure 4. It is to be noted that there are braces 31 and 30 which lie between the inside and outside panels 6 and 13a and 13 and 6a respectively. These braces which form the frame construction of the expandable portion cannot be seen, of course, in Figure 3.

The crucial point of novelty in this invention is, of course, the expandable and inflatable seal 25 which is made of a resilient material, preferably a heavy duty rubber. It is to be noted that the seal is affixed to the horizontal weather boards 17 and 16 and when the extended portion of the trailer is in its closed position the seal 25 is almost back against the inside wall 12a of the main trailer portion. The seal 25 is of a generally circular cross section. It is adhered to the weather board 17 by means of a proper type plastic mastic. It may be inflated, as already mentioned, at the valve 29. As can be seen by the construction, in the event that it leaks it may be replaced very easily. On the other hand, there is available for it a fluid which may be inserted with air pressure which will seal all porous leaks.

In operation the user of the trailer merely sets on the ground the portable support 26 which is of a height equal to the distance of the bottom of the wheel 23 to the bottom of the track 21. The movable track 20 is inserted inside of track 21 and on top of portable support 26. The user then pulls out the extended portion which glides along the track. A wedge may be inserted behind the rollers 22 to prevent them from moving back into the trailer.

With the construction disclosed, it is not necessary to have perfect dimensions for the boards 15 and 17, and 16 and 32. It is to be noted, however, that the seal fills up any open spaces that might allow the elements to obtain admission because of inaccurate dimensions in the aforementioned weather boards.

It is to be noted, but it is not shown in detail, that a similar arrangement of stripping runs along each side of the extended portion. Reference is made to Figure 4 which discloses this feature.

The vertical weather boards are designated as 32 and lie in front of the seal 25. Rear vertical weather boards 34 are behind the seal 25 in Figure 4.

I claim:

An expandable trailer comprising: a fixed body portion and a movable drawer like body portion, an opening in one side of said fixed body portion, said movable drawer like body portion located and adapted to move in said opening, weather boards at the rear of said movable body portion forming a substantially rectangular pattern, a substantially rectangular shaped inflatable seal mounted proximate and in front of said weather boards, other weather boards extending from said fixed body portion about said opening, whereby when said movable body portion is without said fixed portion, an airtight weather seal is formed by said series of weather boards and said inflatable seal.

References Cited in the file of this patent

UNITED STATES PATENTS

| | | |
|---|---|---|
| 1,751,746 | Margana | Mar. 25, 1930 |
| 2,177,394 | Pierce | Oct. 24, 1939 |
| 2,301,963 | Marple et al. | Nov. 17, 1942 |
| 2,323,106 | Whiteman | June 29, 1943 |
| 2,384,659 | Wait | Sept. 11, 1945 |
| 2,469,131 | Ross | May 3, 1949 |
| 2,490,014 | De V. Brand | Dec. 6, 1949 |
| 2,494,013 | Tapp | Jan. 10, 1950 |
| 2,506,870 | Hairston | May 9, 1950 |

FOREIGN PATENTS

| | | |
|---|---|---|
| 585,382 | Great Britain | Feb. 5, 1947 |